US012734915B2

(12) United States Patent
Seemann et al.

(10) Patent No.: US 12,734,915 B2
(45) Date of Patent: Sep. 15, 2026

(54) CONVERTER APPARATUS FOR CONVERTING AN OPERATING CURRENT FOR AN ELECTRIC VEHICLE, DRIVE APPARATUS, AND METHOD FOR CONVERTING AN OPERATING CURRENT

(71) Applicant: ZF FRIEDRICHSHAFEN AG, Friedrichshafen (DE)

(72) Inventors: Frank Seemann, Euerbach (DE); Andre Ehrsam, Bergrheinfeld (DE); Martin Mach, Plzen (CZ); Zbynek Stepan, Plzen (CZ); Vladimir Dvorak, Plzen (CZ); Gabriel Scherer, Deggenhausertal (DE); Rico Glöckner, Pocking (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 411 days.

(21) Appl. No.: 18/017,367

(22) PCT Filed: Jul. 22, 2021

(86) PCT No.: PCT/EP2021/070528
§ 371 (c)(1),
(2) Date: Jan. 20, 2023

(87) PCT Pub. No.: WO2022/018202
PCT Pub. Date: Jan. 27, 2022

(65) Prior Publication Data

US 2023/0271517 A1 Aug. 31, 2023

(30) Foreign Application Priority Data

Jul. 23, 2020 (DE) ..................... 10 2020 209 310.5

(51) Int. Cl.
*B60L 53/20* (2019.01)
*B60K 1/00* (2006.01)
*H02P 5/74* (2006.01)

(52) U.S. Cl.
CPC ................ *B60L 53/20* (2019.02); *B60K 1/00* (2013.01); *H02P 5/74* (2013.01); *B60L 2210/40* (2013.01)

(58) Field of Classification Search
CPC .. B60L 53/20; B60L 2210/40; B60L 2200/40; B60L 2220/42; B60L 1/003;
(Continued)

(56) References Cited

U.S. PATENT DOCUMENTS 5,309,073 A * 5/1994 Kaneko .................. B60L 3/003 307/82
8,074,754 B2 * 12/2011 Gouker .................. B60L 50/51 180/65.265

(Continued)

FOREIGN PATENT DOCUMENTS

DE 4235531 4/1993
DE 102008051592 4/2010

(Continued)

OTHER PUBLICATIONS

Office Action for corresponding German Patent Application No. DE 10 2020 209 310.5.

*Primary Examiner* — Steve Clemmons
(74) *Attorney, Agent, or Firm* — COZEN O'CONNOR

(57) ABSTRACT

A converter apparatus for an electric vehicle includes a battery interface for connecting the converter apparatus to a vehicle battery and a bidirectional inverter having a first connector for connecting the inverter to the battery interface and a second connector. The inverter converts a DC voltage applied to the first connector into an AC voltage and to provide this voltage to the second connector. The converter (Continued)

apparatus includes a switch device having a switch connector for connecting the switch device (118) to the second connector, a drive interface for connecting the converter apparatus to a drive motor, and an additional interface for connecting the converter apparatus to an additional motor. The switch device is designed to connect the switch connector to the drive interface or the additional interface using a switching signal.

13 Claims, 9 Drawing Sheets

(58) Field of Classification Search
CPC ........ B60L 1/006; B60L 53/24; B60L 15/007; B60K 1/00; H02P 5/74; Y02T 10/64; Y02T 10/70; Y02T 10/7072; Y02T 10/72; Y02T 90/14
See application file for complete search history.

(56) References Cited

U.S. PATENT DOCUMENTS

| | | | | |
|---|---|---|---|---|
| 8,183,820 | B2 * | 5/2012 | Anwar | B60L 1/003<br>320/140 |
| 9,490,691 | B2 * | 11/2016 | Keil | H02H 9/04 |
| 10,046,641 | B2 * | 8/2018 | Penmetsa | B60L 1/003 |
| 10,173,543 | B2 * | 1/2019 | Yang | B60L 53/14 |
| 10,821,854 | B2 * | 11/2020 | Ito | B60L 15/025 |
| 12,113,458 | B2 * | 10/2024 | Li | H02M 7/537 |
| 2012/0079821 | A1 * | 4/2012 | Mazumdar | B60L 50/51<br>60/421 |
| 2012/0187758 | A1 * | 7/2012 | Boskovitch | B60K 6/46<br>180/65.245 |
| 2012/0223664 | A1 * | 9/2012 | Januschevski | H02M 7/797<br>318/400.26 |
| 2015/0266382 | A1 | 9/2015 | Penmetsa et al. | |
| 2017/0349054 | A1 * | 12/2017 | Yang | H02M 7/44 |
| 2019/0047432 | A1 * | 2/2019 | Clark | B60L 53/60 |

FOREIGN PATENT DOCUMENTS

| | | |
|---|---|---|
| DE | 202017104921 | 11/2018 |
| DE | 102019201661 | 8/2019 |
| EP | 2733007 | 5/2014 |
| WO | WO 2015071045 | 5/2015 |

* cited by examiner 118
122
134
132
124
202
120
204
200
116
112
131
114
100
206
102

106
312
314
108
102
100
112
131
104
308
310
400
402

CONVERTER APPARATUS FOR CONVERTING AN OPERATING CURRENT FOR AN ELECTRIC VEHICLE, DRIVE APPARATUS, AND METHOD FOR CONVERTING AN OPERATING CURRENT

CROSS REFERENCE TO RELATED APPLICATIONS

This is a U.S. national stage of Application No. PCT/EP2021/070528 filed Jul. 22, 2021. Priority is claimed on German Application No. DE 10 2020 209 310.5 filed Jul. 23, 2020 the content of which is incorporated herein by reference.

BACKGROUND OF THE INVENTION

1. Field of the Invention

The present disclosure relates to a converter apparatus for converting an operating current for an electric vehicle, to a drive apparatus, and to a method for converting an operating current for an electric vehicle.

2. Description of Related Art

There are many auxiliary drive options for work functions for commercial vehicles with internal combustion engines. For example, cranes, tipping bodies, or refrigerated bodies can be operated. The power required is generally taken from the vehicle drive train. Typical interfaces for this are the motor and the gearbox.

SUMMARY OF THE INVENTION

Against this background, the present invention provides an improved converter apparatus for converting an operating current for an electric vehicle, an improved drive apparatus, and an improved method for converting an operating current for an electric vehicle.

A multifunctional and consequently cost-saving possibility is provided by the approach proposed here in order to be able to ensure both a travel function and a work function in an electrified vehicle.

A converter apparatus for converting an operating current for an electric vehicle with a vehicle battery and with a drive apparatus comprising a drive motor and an auxiliary motor is proposed. The converter apparatus here has a battery interface for connecting the converter apparatus to the vehicle battery. The converter apparatus furthermore has a bidirectional inverter with a first connector for connecting the inverter to the battery interface, and with a second connector. The inverter is here designed to convert a direct voltage present at the first connector into an alternating voltage and supply it at the second connector. The converter apparatus moreover has a switch device connected to the inverter and with a switch connector for connecting the switch device to the second connector of the inverter, with a drive interface for connecting the converter apparatus to the drive motor, and with an auxiliary interface for connecting the converter apparatus to the auxiliary motor. The switch device is designed to connect the switch connector, using a switch signal, to the drive interface or the auxiliary interface.

The converter apparatus can be employed in an electric vehicle which, for example, takes the form of an electrified commercial vehicle. The operating current can be supplied using the converter apparatus and used to operate an electric drive. The drive motor of the electric vehicle can comprise at least one electric motor and take the form of, for example, an axle drive, a central drive, or alternatively a wheel drive. The drive motor can, for example, be designed to set the electric vehicle in motion, for example to enable it to drive forward or to reverse. The auxiliary motor can comprise at least one further electric motor and be used, for example, to operate an auxiliary vehicle part, for example an excavator shovel when the electric vehicle takes the form of an excavator, or a crane of the electric vehicle. The auxiliary motor can be designed to supply functionality or movement that goes beyond the locomotion of the vehicle. The bidirectional inverter can be referred to as an inverter. The direct voltage supplied by the vehicle battery can be converted into an alternating voltage which is suitable for operating the drive motor and the auxiliary motor using the inverter. In addition, a fed-in alternating voltage can be converted into a direct voltage in order to charge the vehicle battery. The switch device can have a plurality of switches. The switches can be switched in a suitable combination using the switch signal. Thus, for example, one or more switches can be closed at the same time in order to establish a requested through connection by the switch device. For example, the switch device can be actuated using the switch signal such that the switch connector is connected electrically conductively to the drive interface in the case of a switch signal having a first signal characteristic, and is connected electrically conductively to the auxiliary interface in the case of a switch signal having a second signal characteristic. As a result, the alternating voltage supplied by the inverter can be switched through in a controllable fashion to either the drive interface or the auxiliary interface. In this way, a plurality of functions of the electric vehicle can advantageously be supplied with electrical energy, such as a travel function and an auxiliary function, such as an electrically operated structure of the electric vehicle. The switch signal can be supplied, for example, via an interface to an operating device of the electric vehicle, which can be operated by an operator of the electric vehicle, or via an interface to a control device for automatically controlling the electric vehicle.

According to one aspect of the invention, the switch device can have a current-supply interface for supplying current to an appliance coupled to the current-supply interface. The switch device can here be designed to connect the switch connector to the drive interface or the auxiliary interface or the current-supply interface using the switch signal. This means that, for example, an electrical appliance outside the vehicle can be connected to the electric vehicle via the current-supply interface and current can consequently be supplied to it.

Additionally or alternatively, the switch device can have a charging interface for charging the vehicle battery. The switch device can be designed to connect the switch connector to the drive interface or the auxiliary interface or the charging interface using the switch signal. The inverter can be designed to convert an alternating voltage which is present at the second connector into a direct voltage and to supply it to the first connector in order to charge the vehicle battery. As a result, a battery life of the vehicle battery can advantageously be extended.

The inverter can have a third connector in order to convert a direct voltage present at the first connector into an alternating voltage and supply it to the third connector. The switch device can here have a further switch connector for connecting the switch device to the third connector of the inverter. The switch device can be designed to connect the switch connector to the drive interface or the auxiliary interface using the switch signal and to connect the further switch connector to the current-supply interface or the charging interface using the switch signal. A cable connection between the further switch connector and the third connector can advantageously have a smaller dimension than a further cable connection between the second connector and the switch connector.

According to one aspect of the invention, the converter apparatus can have a mains filter and additionally or alternatively an isolating element, wherein the mains filter and additionally or alternatively the isolating element can be arranged between the third connector and the further switch connector. The mains filter and additionally or alternatively the isolating element can improve a battery charging function of the converter apparatus in order to charge the vehicle battery.

According to one aspect of the invention, the converter apparatus can have a further inverter with a further first connector for connecting the further inverter to the battery interface and to a further drive interface for connecting the converter apparatus to a further drive motor. The further inverter can here be designed in order to convert the direct voltage present at the further first connector into a further alternating voltage and supply it to the further drive interface. The further inverter can have a bidirectional form. By using the further inverter and the further drive motor, the electric vehicle can advantageously perform the drive function, whilst the auxiliary function is being performed. This can be advantageous for vehicles such as, for example, excavators with a shovel, street sweepers, and additionally or alternatively for gritters.

According to one aspect of the invention, the inverter and the switch device can be arranged in a common housing. The further inverter can have a further housing. The inverter and the switch device can advantageously be implemented as a compact unit using the housing. If the further inverter is configured separately, the corresponding components can optimally be arranged in available structural space of the electric vehicle.

A drive apparatus for a vehicle is moreover proposed, wherein the drive apparatus has a converter apparatus in one of the abovementioned variants and the drive motor for driving a wheel of the electric vehicle. The drive motor is connected to the drive interface. The drive apparatus furthermore has an auxiliary motor for supplying an auxiliary function of the electric vehicle, wherein the auxiliary motor is connected to the auxiliary interface.

A wheel or an axle of the electric vehicle and additionally a work function referred to as an auxiliary function can be operated, for example, by the drive apparatus. For example, a lifting platform installed in a trailer of the electric vehicle can be supplied with the alternating voltage by the auxiliary function. According to different embodiments, the drive function for driving the electric vehicle as a whole and the auxiliary function can be performed simultaneously or at different times.

According to an embodiment, the drive apparatus can have the said further drive motor for driving a further wheel of the electric vehicle. The further drive motor can here be connected to the further drive interface. As a result, a plurality of functions of the electric vehicle can advantageously be performed in parallel.

The drive apparatus can furthermore have a coupling device for coupling the drive motor of the further drive motor to an axle for driving the wheel and the further wheel. As a result, it is advantageously possible to set which drive motor is to be actuated.

A method for converting an operating current for an electric vehicle with a vehicle battery and a drive apparatus comprising a drive motor and an auxiliary motor using a converter apparatus in one of the abovementioned variants is moreover proposed. The method comprises a conversion step and a connecting step. In the conversion step, a direct voltage present at the first connector of the inverter is converted into an alternating voltage and the alternating voltage is supplied to the second connector of the inverter. In the connecting step, the switch connector is connected to the drive interface or the auxiliary interface using a switch signal.

The method can be carried out, for example, in an electrified commercial vehicle. A user of the electric vehicle can advantageously control which switches are closed.

According to one aspect of the invention, the method can comprise a step of determining the switch signal depending on an operating function of the electric vehicle. The operating function can advantageously be selected by the user, for example using an operating device.

BRIEF DESCRIPTION OF THE DRAWINGS

The invention will be explained in detail with the aid of the attached drawings, in which.

DETAILED OF THE PRESENTLY PREFERRED EMBODIMENTS

The same or similar reference signs are used in the following description of preferred exemplary embodiments of the present invention for the elements which are illustrated in the different drawings and act in a similar fashion, the description of these elements not being repeated.

Figure 1:
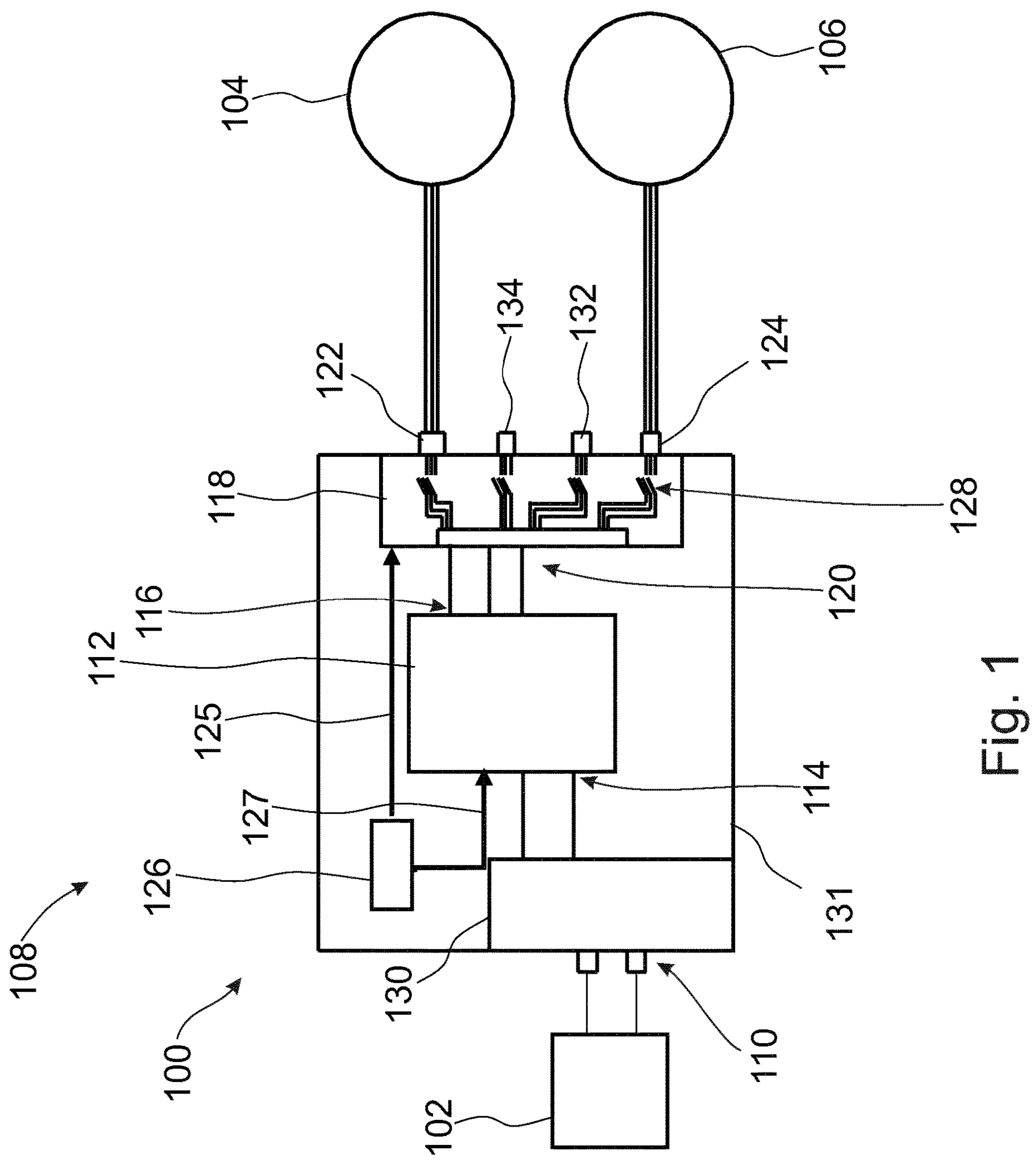
FIG. 1 is a schematic illustration of a converter apparatus.

FIG. 1 shows a schematic illustration of a converter apparatus 100 according to an exemplary embodiment. The converter apparatus 100 is designed to convert an operating current for an electric vehicle with a vehicle battery 102 and a drive apparatus 108 comprising a drive motor 104 and an auxiliary motor 106. The converter apparatus 100 here has a battery interface 110 for connecting the converter apparatus 100 to the vehicle battery 102. The converter apparatus 100 furthermore has a bidirectional inverter 112 with a first connector 114 for connecting the inverter 112 to the battery interface 110 and to a second connector 116. The inverter 112 is here designed to convert a direct voltage present at the first connector 114 into an alternating voltage and supply it at the second connector 116. The converter apparatus 100 furthermore has a switch device 118 connected to the inverter 112. The switch device 118 has a switch connector 120 for connecting the switch device 118 to the second connector 116 of the inverter 112, and a drive interface 122 for connecting the converter apparatus 100 to the drive motor 104, and an auxiliary interface 124 for connecting the converter apparatus 100 to the auxiliary motor 106. The switch device 118 is designed to connect the switch connector 120 to the drive interface 122 or the auxiliary interface 124 using a switch signal 125. This means that the switch signal 125 which is supplied, for example, by a control unit 126 specifies according to this exemplary embodiment which connection within the switch device 118 is supplied. For example, the switch signal 125 is supplied by the control unit 126 with a first signal characteristic when the alternating voltage supplied by the inverter 112 is to be supplied to the drive motor 104 via the drive interface 122. In contrast, the switch signal 125 is supplied by the control unit 126, for example, with a second signal characteristic when the alternating voltage supplied by the inverter 112 is to be supplied to the auxiliary motor 106 via the auxiliary interface 124.

According to one aspect of the invention, the control unit 126 is designed to supply a control signal 127 for controlling the inverter 112. The control signal 127 is, for example, suitable for setting at least one parameter of the alternating voltage supplied by the inverter 112, for example a frequency or amplitude. In this way, a current suitable for operating the drive motor 104 or the auxiliary motor 106 can be supplied as required. The control unit 126 can be designed to supply the switch signal 125 and optionally the control signal 127 in response to an operating action of an operator of the electric vehicle.

According to this exemplary embodiment, the converter apparatus 100 optionally has a distributor device 130 which is arranged, for example, between the battery interface 110 and the inverter 112. According to this exemplary embodiment, the converter apparatus 100 has a housing 131 which is arranged, for example, at least around the inverter 112 and the switch device 118. According to this exemplary embodiment, the control unit 126 and the distributor device 130 are optionally additionally arranged in the housing 131.

According to this exemplary embodiment, the switch device 118 furthermore optionally has a current-supply interface 132 which is designed to supply current to an appliance coupled to the current-supply interface 132, for example an appliance outside the vehicle. The switch device 118 is here designed to connect the switch connector 120 to the drive interface 122, the auxiliary interface 124, or the current-supply interface 132 using the switch signal 125. For this purpose, the switch signal 125 can assume suitable further characteristics.

According to an exemplary embodiment, the switch device 118 furthermore has a charging interface 134 for charging the vehicle battery 102. The switch device 118 is here designed according to this exemplary embodiment to connect the switch connector 120 to the charging interface 134 using a corresponding switch signal 125. The inverter 112 is here designed to convert an alternating voltage present at the second connector 116 via the charging interface 134 and the switch device 118 into a direct voltage and supply it to the first connector 114. This means that, for example, a connection can be established between a power source outside the vehicle and the charging connector 134 in order to charge the vehicle battery 102.

According to this exemplary embodiment, the switch device 118 has a plurality of switches 128, in particular four of them. Each of the interfaces 122, 124, 132, 134 is here associated with one of the switches 128. The switches 128 are actuated by way of example via the switch signal 125.

According to an exemplary embodiment, the interfaces 110, 122, 124, 132, 134 are configured as suitable connecting devices, for example plug connectors, on the housing 131.

According to this exemplary embodiment, the drive apparatus 108 has the converter apparatus 100, the drive motor 104, and the auxiliary motor 106. The drive motor 104 is here designed to drive a wheel of the electric vehicle by, for example, the wheel directly or, for example, a wheel axle of the electric vehicle being activated such that the electric vehicle is set in motion. The drive motor 104 is here connected to the drive interface 122 and is supplied with an operating current required for operation via the drive interface 122. The auxiliary motor 106 is designed to supply an auxiliary function of the electric vehicle. For this purpose, the auxiliary motor 106 is connected to the auxiliary interface 124. In this way, the auxiliary motor 106 is supplied with an operating current required for operation via the auxiliary interface 124.

By the approach proposed here, use is enabled of the converter apparatus 100, which is required for the drive motor 104, also referred to as a traction motor, for the auxiliary drive 106, for a current-supply function for example by a 400V and 50 Hz network, and for a charging function of the electric vehicle. This is useful because of the change to electrically driven commercial vehicles with corresponding auxiliary drive options. This means that, for example, workers that perform the work functions, also referred to here as auxiliary functions, each have a distinct interface in order to operate. Such an interface is, for example, the auxiliary interface 124. In order to draw energy from the vehicle battery 102 and, for example, operate a three-phase motor such as, for example, the drive motor 104 and/or the auxiliary motor 106, according to this exemplary embodiment the converter apparatus 100, which is also referred to as an inverter, is used. Compared with existing vehicles which require an independent inverter for each function, the electric vehicle according to this exemplary embodiment has just the converter apparatus 100 which can be used for all functions.

According to this exemplary embodiment, the converter apparatus 100 is used for the drive of the vehicle, which drive takes the form, for example, of a traction motor or alternatively a plurality of traction motors with a plurality of inverters, for a charging function of the vehicle battery 102, for example by an alternating-current charging station or so-called Schuko/CEE grounded socket outlets, and for the auxiliary motor 106 for, for example, a hydraulic unit of a truck crane. The approach proposed here furthermore enables the establishment of a, for example, 400V 50 Hz standalone network on the electric vehicle in order to be able to use different electrical appliances. According to this exemplary embodiment, a current of the vehicle battery 102 is variable such that the current is above or below the abovementioned value. This is advantageous, for example, for construction sites and municipal vehicles. Alternatively, a so-called "power-to-grid" function is also conceivable.

According to this exemplary embodiment, the inverter 112, which is referred to, for example, as an inverter unit and functions bidirectionally, is arranged in the housing 131. Alternatively, some or all of the components of the converter apparatus 100 are placed, for example, separately in the electric vehicle.

Figure 2:
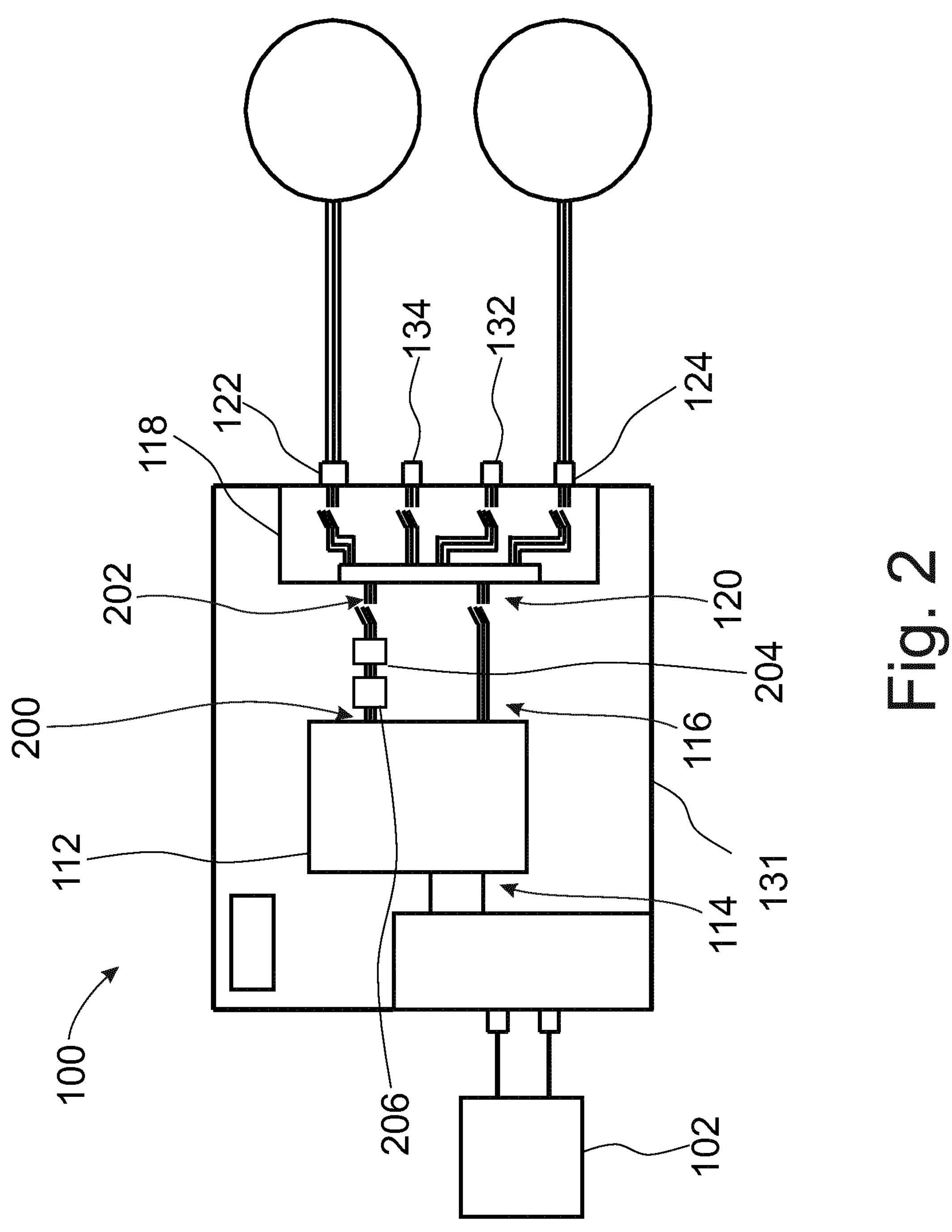
FIG. 2 is a schematic illustration of a converter apparatus.

FIG. 2 shows a schematic illustration of a converter apparatus 100 according to an exemplary embodiment. The converter apparatus 100 illustrated here can correspond to or at least be similar to, for example, the converter apparatus

100 described in FIG. 1. However, the inverter 112 according to this exemplary embodiment has, in contrast to the inverter 112 from FIG. 1, a third connector 200 in order to convert a direct voltage present at the first connector 114 into an alternating voltage and supply it at the third connector 200. According to this exemplary embodiment, the switch device 118 moreover has, in addition to the switch connector 120, a further switch connector 202 for connecting the switch device 118 to the third connector 200 of the inverter 112. Furthermore, the switch device 118 is optionally designed to connect the switch connector 120 to the drive interface 122 or the auxiliary interface 124 using the switch signal, and to connect the further switch connector 202 to the current-supply interface 132 or the charging interface 134 using the switch signal. This means that, according to this exemplary embodiment, during a charging process of the vehicle battery 102, a flow of current takes place in the direction of the vehicle battery 102 via the third connector 200 instead of the second connector 116.

Furthermore, the converter apparatus 100 according to this exemplary embodiment optionally has a mains filter 204 and/or an isolating element 206. According to this exemplary embodiment, the mains filter 204 and/or the isolating element 206 is arranged between the third connector 200 and the further switch connector 202. If, according to an exemplary embodiment, power for the charging process and/or for a current-supply process is limited, a cable connection which connects the third connector 200 to the further switch connector 202 can have a smaller dimension than a further cable connection which connects the second connector 116 to the switch connector 120. According to this exemplary embodiment, both cable connections can be switched on and off independently of each other using further switches.

According to this exemplary embodiment, the current-supply interface 132 is formed, for example, as a 220V or 230V 50 Hz connector and/or as any desired mains interface.

Figure 3:
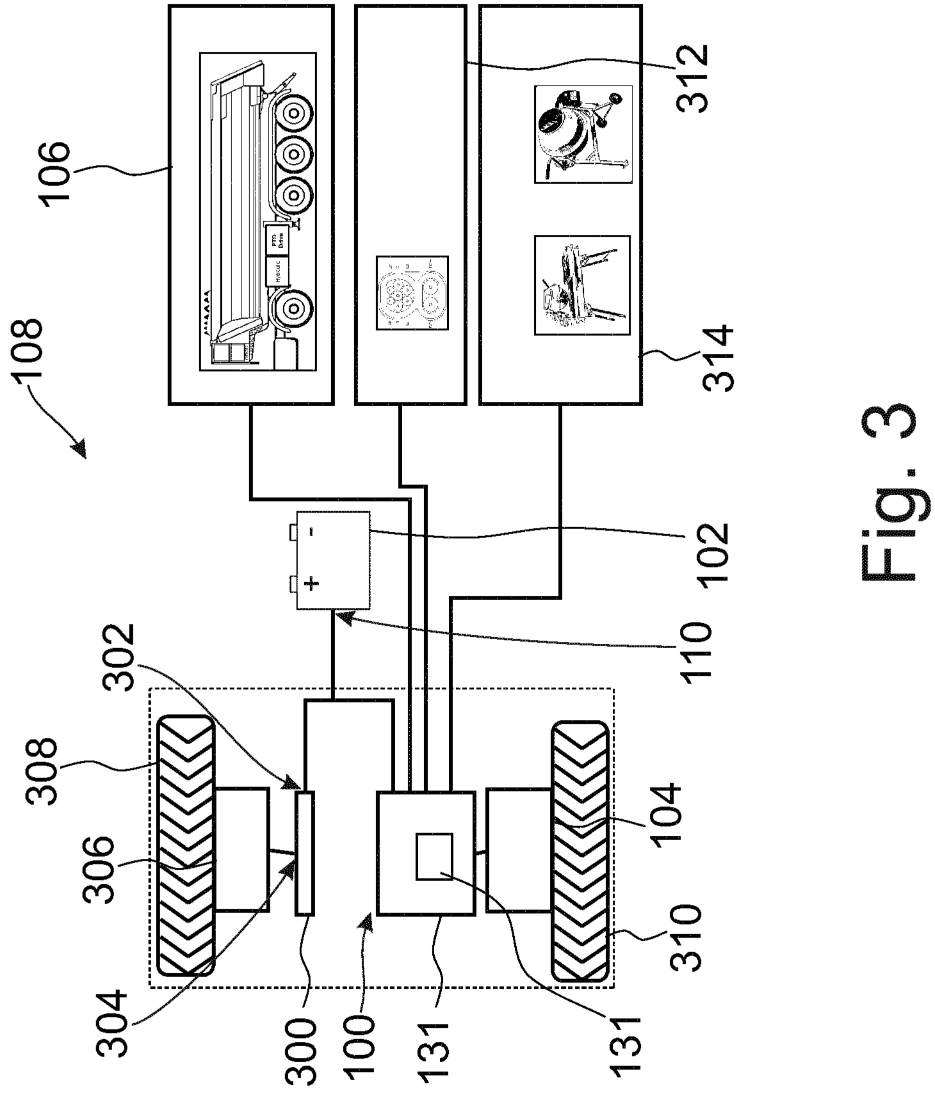
FIG. 3 is a schematic illustration of a drive apparatus.

FIG. 3 shows a schematic illustration of a drive apparatus 108 according to an exemplary embodiment. The drive apparatus 108 illustrated here can correspond to or at least be similar to the drive apparatus 108 described in FIG. 1. Furthermore, the converter apparatus 100 illustrated here as part of the drive apparatus 108 can correspond to or be similar to the converter apparatus 100 described in one of FIG. 1 or 2 which is, for example, formed to be multifunctional. In contrast, the converter apparatus 100 illustrated here has a further inverter 300 which comprises a further first connector 302 and a further drive interface 304.

According to this exemplary embodiment, the further first connector 302 is designed to connect the further inverter 300 to the battery interface 110. The further inverter 300 according to this exemplary embodiment is connected to a further drive motor 306 of the electric vehicle by the further drive interface 304. According to this exemplary embodiment, the driving of individual wheels is made possible as a result. The further inverter 300 is here designed to convert the direct voltage present at the further first connector 302 into a further alternating voltage and supply it to the further drive interface 304.

The further inverter 300 according to this exemplary embodiment is entirely optionally designed as bidirectional. According to this exemplary embodiment, the further inverter 300 is arranged in a further housing, whilst the inverter 112 and the switch device not shown according to this exemplary embodiment share the housing 131.

According to this exemplary embodiment, the further drive motor 306 is formed as part of the drive apparatus 108. The further drive motor 306 is here connected to the further drive interface 304 and designed to drive a further wheel 308 of the electric vehicle. The drive motor 104 has a similar design in order to drive the wheel 310 of the electric vehicle.

According to this exemplary embodiment, it is possible to perform the charging process of the vehicle battery 102 by a connection to a charging unit 312, for example by a connection to an external power network or an appliance 314 outside the vehicle, for example a 230V consumer unit or a 400V consumer unit such as a saw or a mixer. An auxiliary motor 106 can moreover be supplied with current, for example in order to move truck bodies of the electric vehicle. This means that the converter apparatus 100 can actuate the auxiliary function, for example when the electric vehicle is stationary. According to this exemplary embodiment, the vehicle battery 102 is connected both to the inverter 112 and to the further inverter 300.

Figure 4:
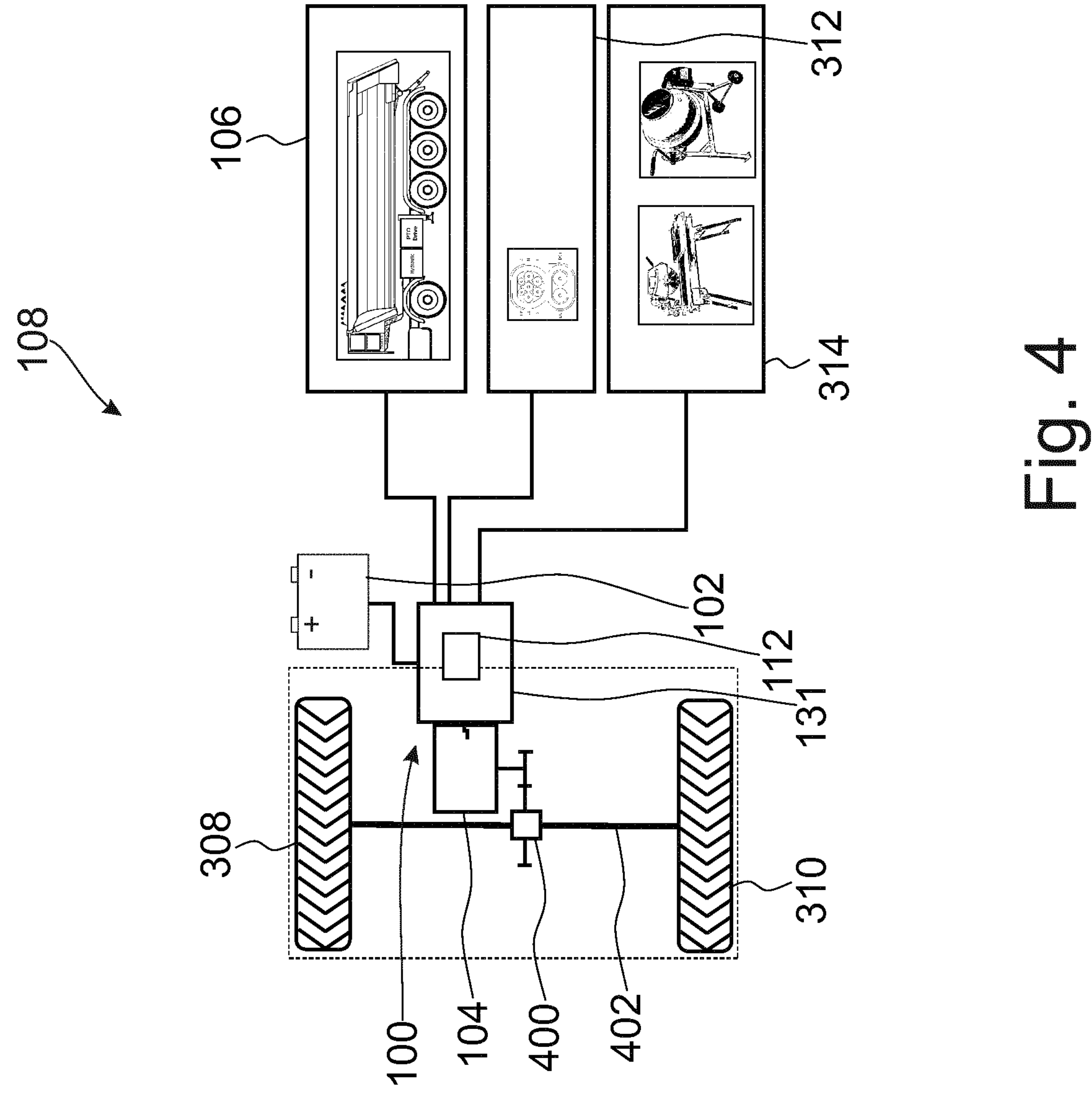
FIG. 4 is a schematic illustration of a drive apparatus.

FIG. 4 shows a schematic illustration of a drive apparatus 108 according to an exemplary embodiment. The drive apparatus 108 can correspond to or at least be similar to, for example, the drive apparatus 108 described in FIG. 3. In a small difference from FIG. 3, the drive apparatus 108 shown here has just the converter apparatus 100 and the drive motor 104 and the auxiliary motor 106. According to this exemplary embodiment, the electric vehicle has a differential gearbox 400 which is connected to the drive motor 104. As a result, the vehicle is driven by an axle drive, i.e. with an axle 402 by which the wheel 310 and the further wheel 308 are connected. According to this exemplary embodiment, the converter apparatus 100 is designed either to set the vehicle in motion or to actuate an auxiliary function of the vehicle. However, the electric vehicle is here stationary.

Figure 5:
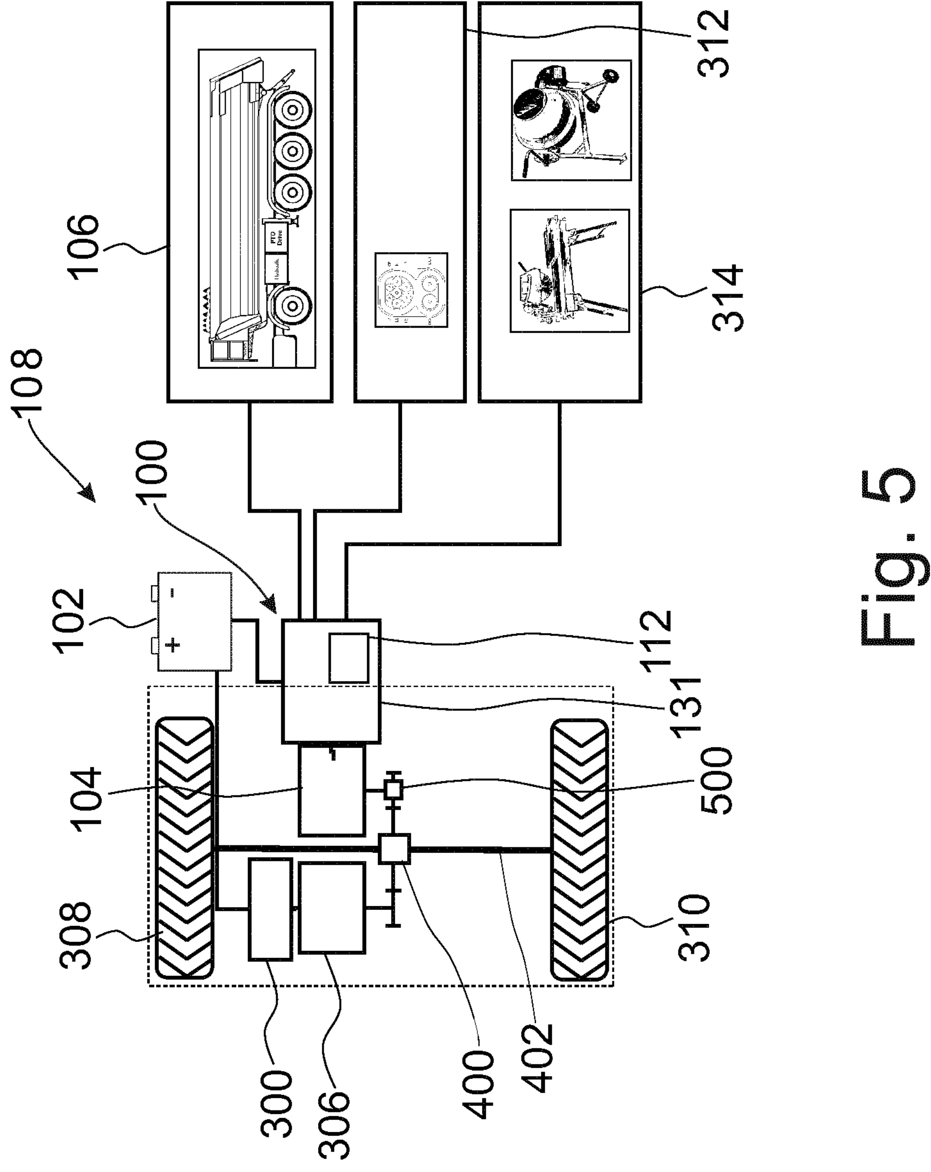
FIG. 5 is a schematic illustration of a drive apparatus.

FIG. 5 shows a schematic illustration of a drive apparatus 108 according to an exemplary embodiment. The drive apparatus 108 can correspond to or be similar to, for example, the drive apparatus 108 described in FIG. 4. In a small difference, the drive apparatus 108 illustrated here also has the further drive motor 306 and the further inverter 300 in addition to the drive motor 104. As also in FIG. 4, the drive apparatus 108 illustrated here has the differential gearbox 400.

Additionally and hence in contrast, the drive apparatus 108 according to this exemplary embodiment optionally has a coupling device 500 which is designed according to this exemplary embodiment to drive the drive motor 104 or the further drive motor 306 the wheel 310 connected to the axle 402 and the further wheel 308. According to this exemplary embodiment, the possibility is created by the coupling device 500 of moving the electric vehicle and simultaneously performing an auxiliary function. The coupling device 500 is, for example, designed to switch between the drive motor 104 and the auxiliary motor 106. According to this exemplary embodiment, the vehicle battery 102 is furthermore connected both to the inverter 112 and to the further inverter 300.

According to this exemplary embodiment, in other words it is made possible by the coupling device 500 to perform a travel function and an auxiliary function in parallel. The range of the electric vehicle is, for example, reduced here because, for example, only one of the drive motors 104, 306 is available. When, for example, an asynchronous machine (ASM), which is also referred to as a three-phase asynchronous machine, is used, the coupling device 500 is optional according to an exemplary embodiment because the ASM rotates under no load.

Figure 6:
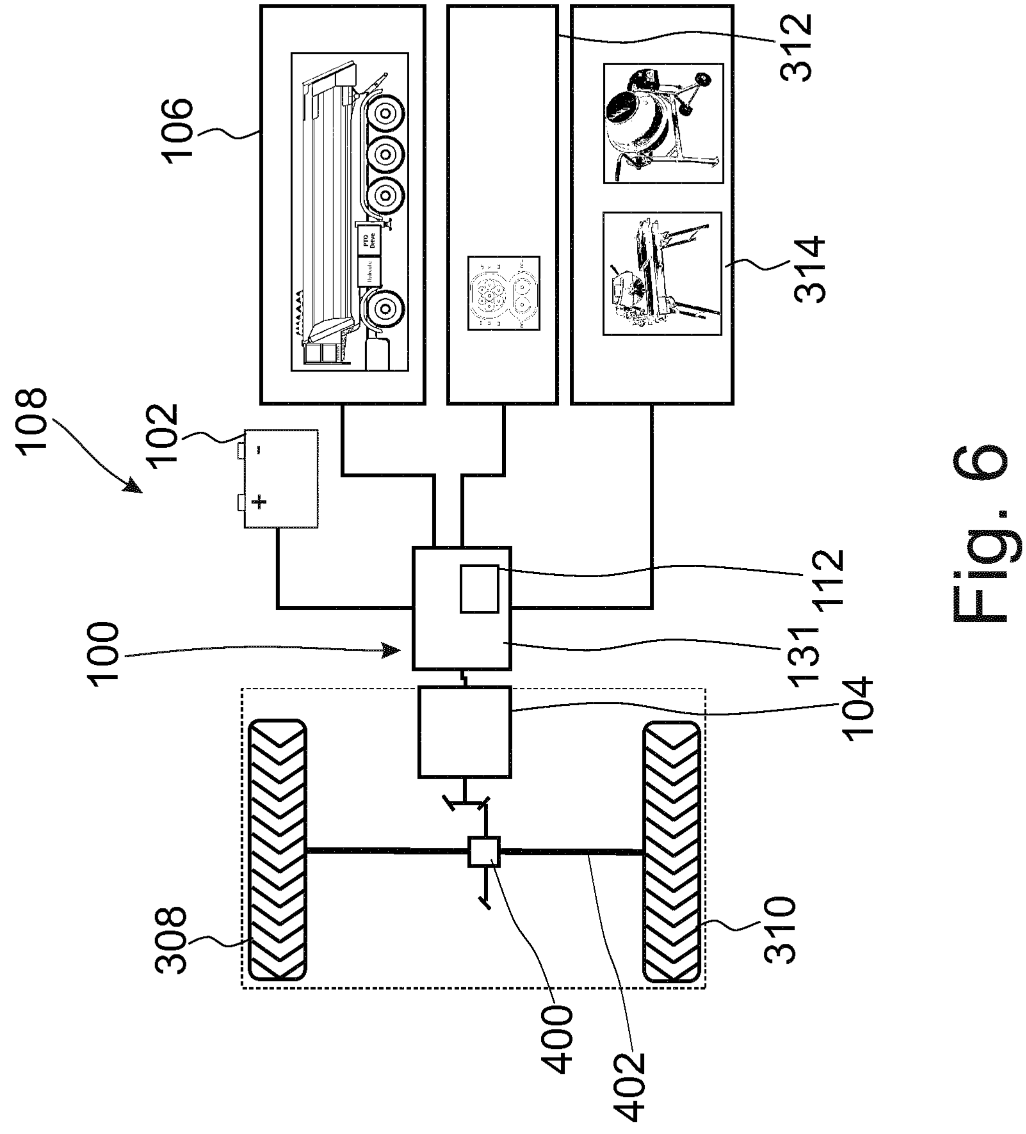
FIG. 6 is a schematic illustration of a drive apparatus.

FIG. 6 shows a schematic illustration of a drive apparatus 108 according to an exemplary embodiment. The drive apparatus 108 illustrated here can correspond to or be similar to, for example, the drive apparatus 108 described in FIG. 4. According to this exemplary embodiment, the drive apparatus 108 has a central drive and can be conceived, for example, for performing the auxiliary functions when stationary.

Figure 7:
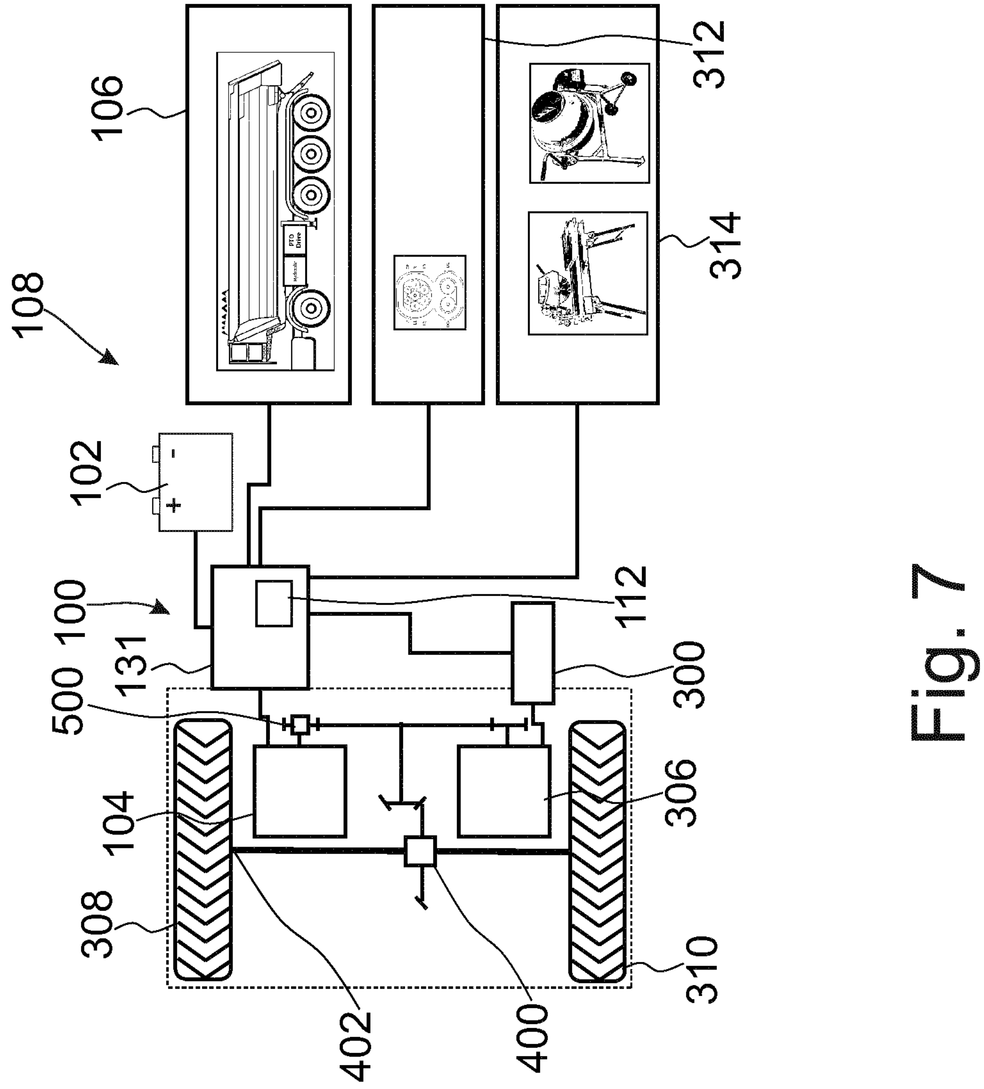
FIG. 7 is a schematic illustration of a drive apparatus.

FIG. 7 shows a schematic illustration of a drive apparatus 108 according to an exemplary embodiment. According to this exemplary embodiment, it is an alternative exemplary embodiment of the drive apparatus 108 shown and described in FIG. 5, in which, for example, although an arrangement of the individual components is different, the same functionality is obtained for the electric vehicle.

Also according to this exemplary embodiment, in other words it is made possible by the coupling device 500 to perform a travel function and an auxiliary function in parallel. The range of the electric vehicle is, for example, reduced here because, for example, only one of the drive motors 104, 306 is available. This is expedient, for example, in the case of an electric vehicle in the form of a street sweeper or a vehicle for winter service. When, for example, an asynchronous machine (ASM), which is also referred to as a three-phase asynchronous machine, is used, the coupling device 500 is also optional according to an alternative exemplary embodiment because the ASM rotates under no load.

Figure 8:
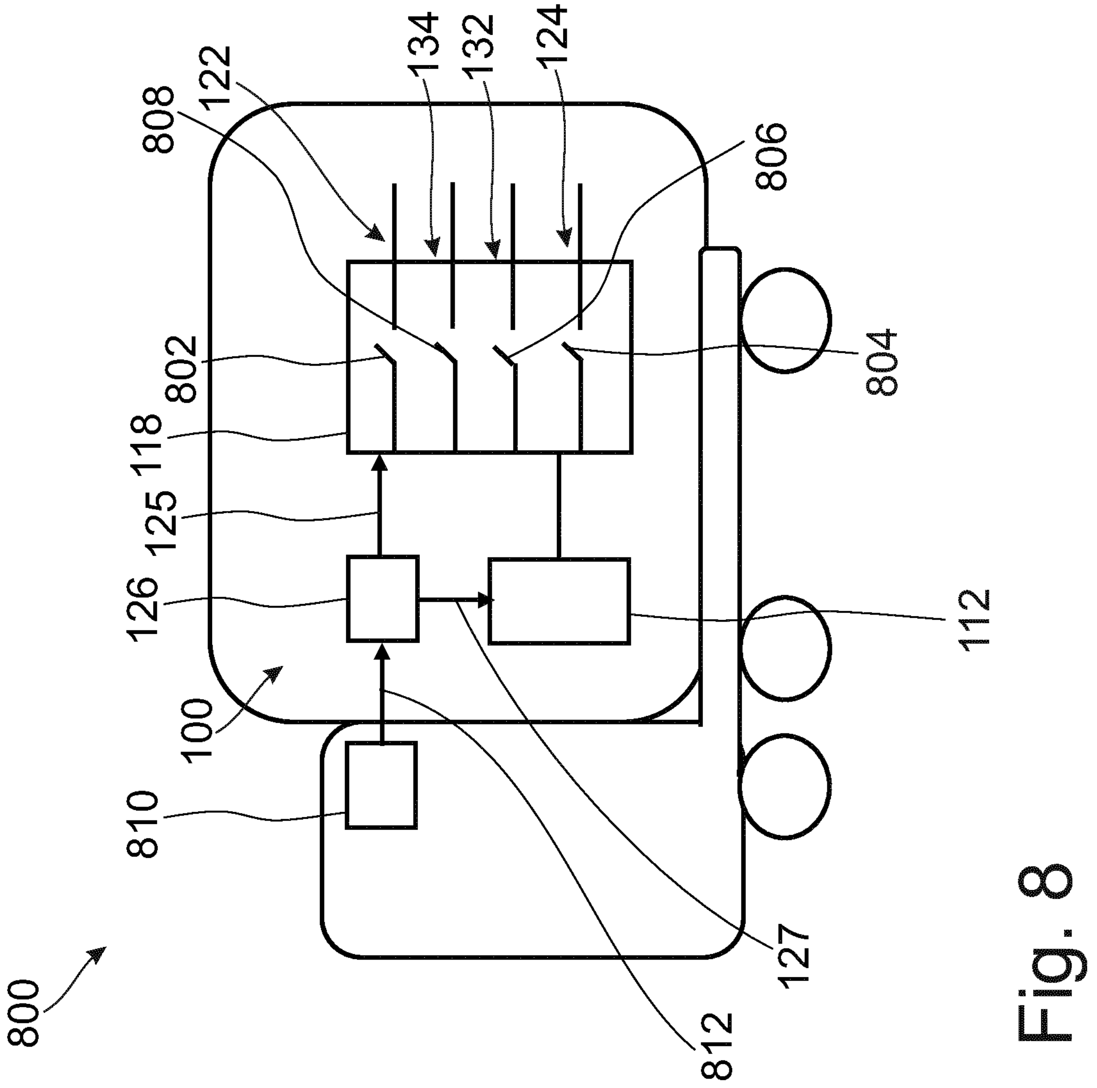
FIG. 8 is a schematic illustration of an electric vehicle with a converter apparatus.

FIG. 8 shows a schematic illustration of an electric vehicle 800 with a converter apparatus 100 according to an exemplary embodiment. The electric vehicle 800 has, according to this exemplary embodiment, the converter apparatus 100 as has been described, for example, in one of FIGS. 1 to 7 as part of a drive apparatus. According to this exemplary embodiment, the electric vehicle 800 takes the form of a commercial vehicle which has, for example, a trailer. According to this exemplary embodiment, the switch device 118 has a first switch 802 which is designed to establish a connection to the drive motor which is not shown here or to the drive interface 122. The switch device 118 furthermore has a second switch 804 which is designed to establish a connection to the auxiliary motor which is not shown here or to the auxiliary interface 124. According to this exemplary embodiment, the switch device 118 moreover has a third switch 806 which is designed to establish a connection to the current-supply interface 132 when, for example, the appliance outside the vehicle is supplied with current. A fourth switch 808 of the switch device 118 is designed to establish a connection to the charging interface 124 when, for example, charging of the vehicle battery (not illustrated here) takes place.

This means that, for example, a driver of the electric vehicle 800 according to this exemplary embodiment can supply a functional signal 812 to the control unit 126, triggered by activation of an operating device 810. According to this exemplary embodiment, the functional signal 812 here represents a desired operating function of the electric vehicle 800. The control unit 126 is designed according to this exemplary embodiment to supply the switch signal 125 and the control signal 127 using the functional signal 812. The control signal 127 here effects the control of the inverter 112. The inverter 112 is also designed according to this exemplary embodiment to convert a current which is present.

If, for example, the functional signal 812 requests driving mode, the control unit 126 is designed to supply the switch signal 125 for closing the first switch 802 and opening the further switch 804, 806, 808, and the control signal 127 which effects conversion of the direct voltage present at the inverter 112 into an alternating voltage suitable for operating the drive motor.

If the functional signal 812 requests an auxiliary function, the control unit 126 is designed to supply the switch signal 125 for closing the second switch 804 and opening the further switch 802, 806, 808, and the control signal 127 which effects conversion of the direct voltage present at the inverter 112 into an alternating voltage suitable for operating the auxiliary motor.

If the functional signal 812 requests a current-supply function, the control unit 126 is designed to supply the switch signal 125 for closing the third switch 806 and opening the further switch 802, 804, 808 and the control signal 127 which effects conversion of the direct voltage present at the inverter 112 into an alternating voltage suitable for output to the current-supply interface 132.

If the functional signal 812 requests charging mode, the control unit 126 is designed to supply the switch signal 125 for closing the fourth switch 808 and opening the further switch 802, 804, 806 and the control signal 127 which effects conversion of the alternating voltage present at the inverter 112 into a direct voltage suitable for output to the charging interface.

Figure 9:
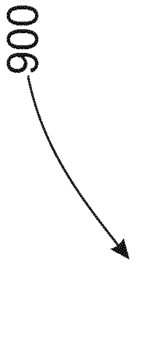
FIG. 9 is a flow diagram of a method for converting an operating current.
Figure 9:
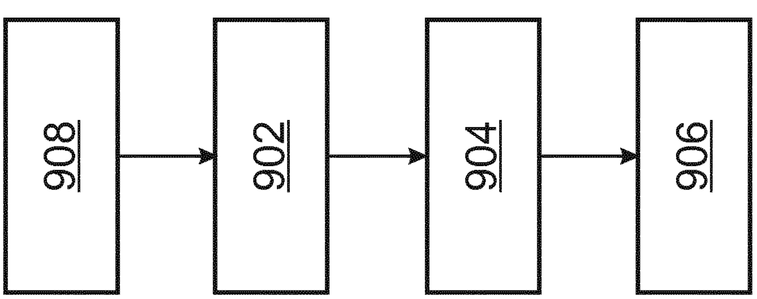

FIG. 9 shows a flow diagram of a method 900 for converting an operating current for an electric vehicle with a vehicle battery and a drive apparatus comprising a drive motor and an auxiliary motor using a converter apparatus. The method 900 can be performed, for example, for an electric vehicle, as was described in FIG. 8. The method 900 here comprises a conversion step 902, a supply step 904, and a connecting step 906. In the conversion step 902, a direct voltage present at the first connector of the inverter is converted into an alternating voltage. In the supply step 904, the alternating voltage is supplied to the second connector of the inverter. In the connecting step 906, the switch connector is connected to the drive interface or the auxiliary interface using a switch signal. Entirely optionally, the method 900 furthermore comprises a step 908 of determining the switch signal depending on an operating function of the vehicle. The determination step 908 is here performed, for example, before the conversion step 902.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A converter apparatus configured to convert an operating current for an electric vehicle with a vehicle battery and a drive apparatus comprising a drive motor and an auxiliary motor, comprising:

a battery interface configured to connect the converter apparatus to the vehicle battery;

a bidirectional inverter with a first connector configured to connect the inverter to the battery interface, and with a second connector, wherein the inverter is configured to convert a direct voltage present at the first connector into an alternating voltage and supply it at the second connector; and a switch device connected to the inverter and with a switch connector configured as a bus that is directly connected between the switch device and the second connector of the inverter for connecting the switch device to the second connector of the inverter, and with a drive interface configured to directly connect the converter apparatus to the drive motor via a respective single switch between the switch connector and the drive interface and with an auxiliary interface configured to connect the converter apparatus directly to the auxiliary motor via a respective single switch between the switch connector and the auxiliary interface, wherein the switch device is configured to connect the switch connector, using a switch signal, to the drive interface or the auxiliary interface.

2. The converter apparatus as claimed in claim 1, wherein the switch device has a current-supply interface configured to supply current to an appliance coupled to the current-supply interface, and wherein the switch device is configured to connect the switch connector to the drive interface or the auxiliary interface or the current-supply interface using the switch signal.

3. The converter apparatus as claimed in claim 2, wherein the switch device has a charging interface configured to charge the vehicle battery, and wherein the switch device is configured to connect the switch connector to the drive interface or the auxiliary interface or the charging interface using the switch signal, and wherein the inverter is designed to convert the alternating voltage which is present at the second connector into a direct voltage and to supply it to the first connector.

4. The converter apparatus as claimed in claim 3, wherein the inverter has a third connector in order to convert a direct voltage present at the first connector into the alternating voltage and supply it at the third connector, and wherein the switch device has a further switch connector configured to connect the switch device to the third connector of the inverter, and wherein the switch device is configured to connect the switch connector to the drive interface or the auxiliary interface using the switch signal and to connect the further switch connector to the current-supply interface or the charging interface using the switch signal.

5. The converter apparatus as claimed in claim 2, wherein the inverter has a third connector in order to convert a direct voltage present at the first connector into the alternating voltage and supply it at the third connector, and wherein the switch device has a further switch connector configured to connect the switch device to the third connector of the inverter, and wherein the switch device is configured to connect the switch connector to the drive interface or the auxiliary interface using the switch signal and to connect the further switch connector to the current-supply interface or a charging interface using the switch signal.

6. The converter apparatus as claimed in claim 5, further comprising a mains filter and/or an isolating element, wherein the mains filter and/or the isolating element is arranged between the third connector and the further switch connector.

7. The converter apparatus as claimed in claim 1, further comprising a further inverter with a further first connector configured to connect the further inverter to the battery interface and to a further drive interface configured to connect the converter apparatus to a further drive motor, wherein the further inverter is configured to convert the direct voltage present at the further first connector into a further alternating voltage and supply it to the further drive interface.

8. The converter apparatus as claimed in claim 7, wherein the inverter and the switch device are arranged in a common housing, and wherein the further inverter has a further housing.

9. A drive apparatus for an electric vehicle, comprising:

a converter apparatus configured to convert an operating current for an electric vehicle with a vehicle battery and a drive apparatus comprising a drive motor and an auxiliary motor, comprising:

a battery interface configured to connect the converter apparatus to the vehicle battery;

a bidirectional inverter with a first connector configured to connect the inverter to the battery interface, and with a second connector, wherein the inverter is configured to convert a direct voltage present at the first connector into an alternating voltage and supply it at the second connector; and a switch device connected to the inverter and with a switch connector configured as a bus that is directly connected between the switch device and the second connector of the inverter for connecting the switch device to the second connector of the inverter, and with a drive interface configured to directly connect the converter apparatus to the drive motor via a respective single switch between the switch connector and the drive interface and with an auxiliary interface configured to connect the converter apparatus directly to the auxiliary motor via a respective single switch between the switch connector and the auxiliary interface, wherein the switch device is configured to connect the switch connector, using a switch signal, to the drive interface or the auxiliary interface;

the drive motor for driving a wheel of the electric vehicle, wherein the drive motor is connected to the drive interface; and an auxiliary motor for supplying an auxiliary function of the electric vehicle, wherein the auxiliary motor is connected to the auxiliary interface.

10. The drive apparatus as claimed in claim 9, further comprising a further drive motor configured to drive a further wheel of the electric vehicle, wherein the further drive motor is connected to a further drive interface.

11. The drive apparatus as claimed in claim 9, further comprising a coupling device for coupling the drive motor or a further drive motor to an axle for driving the wheel and a further wheel.

12. A method for converting an operating current for an electric vehicle with a vehicle battery, a drive apparatus, and a converter apparatus configured to convert an operating current for an electric vehicle with a vehicle battery and a drive apparatus comprising a drive motor and an auxiliary motor, having: a battery interface configured to connect the converter apparatus to the vehicle battery; a bidirectional inverter with a first connector configured to connect the inverter to the battery interface, and with a second connector, wherein the inverter is configured to convert a direct voltage present at the first connector into an alternating voltage and supply it at the second connector; and a switch device connected to the inverter and with a switch device connected to the inverter and with a switch connector configured as a bus that is directly connected between the switch device and the second connector of the inverter for connecting the switch device to the second connector of the inverter, and with a drive interface configured to directly connect the converter apparatus to the drive motor via a respective single switch between the switch connector and the drive interface and with an auxiliary interface configured to connect the converter apparatus directly to the auxiliary motor via a respective single switch between the switch connector and the auxiliary interface, wherein the switch device is configured to connect the switch connector, using a switch signal, to the drive interface or the auxiliary interface; the drive motor for driving a wheel of the electric vehicle, wherein the drive motor is connected to the drive interface; and an auxiliary motor for supplying an auxiliary function of the electric vehicle, wherein the auxiliary motor is connected to the auxiliary interface, comprising:

converting a direct voltage present at the first connector of the inverter into the alternating voltage and supplying the alternating voltage to the second connector of the inverter; and connecting the switch connector to the drive interface or the auxiliary interface using the switch signal.

13. The method as claimed in claim 12, further comprising determining the switch signal depending on an operating function of the electric vehicle.

* * * * *